(12) United States Patent
Desmouceaux et al.

(10) Patent No.: US 11,216,298 B2
(45) Date of Patent: *Jan. 4, 2022

(54) ZERO-LOSS WORKLOAD MOBILITY WITH SEGMENT ROUTING FOR VIRTUAL MACHINES

(71) Applicant: Cisco Technology, Inc., San Jose, CA (US)

(72) Inventors: Yoann Desmouceaux, Paris (FR); Pierre Pfister, Chalons-en-Champagne (FR); William Mark Townsley, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/829,948

(22) Filed: Mar. 25, 2020

(65) Prior Publication Data
US 2020/0225977 A1    Jul. 16, 2020

Related U.S. Application Data

(63) Continuation of application No. 15/945,726, filed on Apr. 4, 2018, now Pat. No. 10,635,480.

(51) Int. Cl.
*G06F 9/455* (2018.01)
*H04L 12/931* (2013.01)

(52) U.S. Cl.
CPC .......... *G06F 9/45558* (2013.01); *H04L 49/70* (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2014/0013324 A1* | 1/2014 | Zhang | H04L 49/70 718/1 |
| 2014/0052875 A1 | 2/2014 | Carter et al. | |
| 2015/0207667 A1* | 7/2015 | Basso | H04L 49/70 709/223 |
| 2019/0182207 A1 | 6/2019 | Tsirkin | |
| 2019/0310871 A1 | 10/2019 | Desmouceaux et al. | |

* cited by examiner

*Primary Examiner* — Charlie Sun
(74) *Attorney, Agent, or Firm* — Lee & Hayes, P.C.

(57) ABSTRACT

Techniques for zero-loss workload mobility with segment routing for virtual machines are presented. The techniques include receiving, by a virtual router, an electronic message destined for a first virtual machine running on a first physical machine and checking a first virtual machine state for the first virtual machine. In response to determining that it is associated with a running state indicating the first physical machine, inserting a segment routing header including an indication of the source virtual machine, the first physical machine, and the first virtual machine. In response to determining that it is associated with a migration state, inserting, by the virtual router, a segment routing header indicating the source virtual machine, an END.S for the first physical machine, the first virtual machine; and an END.S-BUF for a second physical machine. The message is then routed based at least in part on the inserted segment routing header.

20 Claims, 5 Drawing Sheets

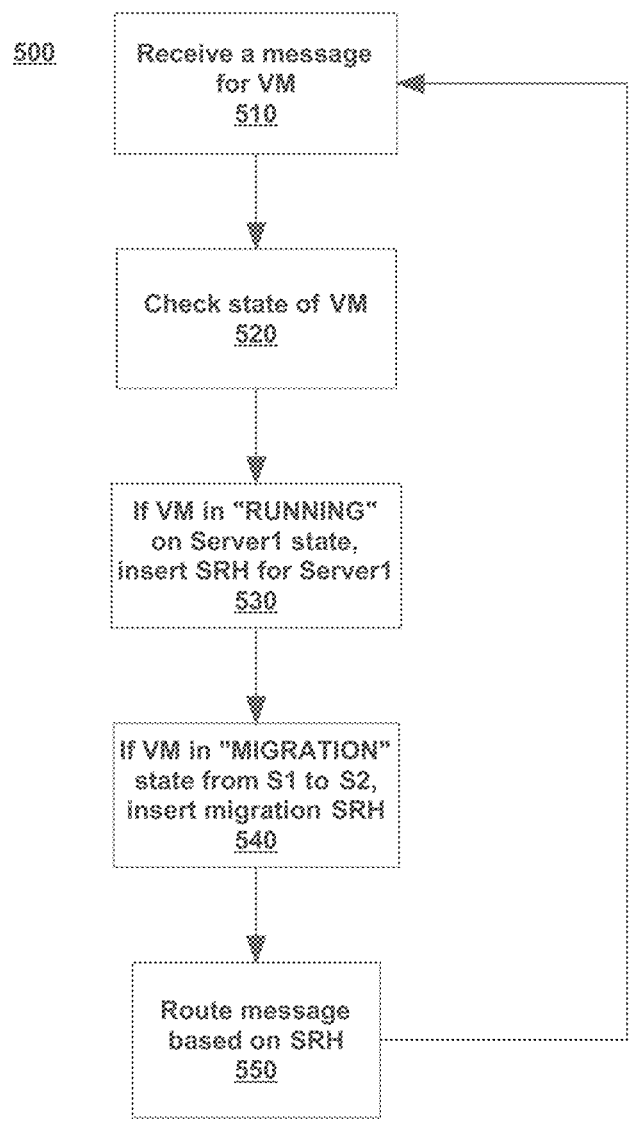

ZERO-LOSS WORKLOAD MOBILITY WITH SEGMENT ROUTING FOR VIRTUAL MACHINES

RELATED APPLICATIONS

This application claims priority to and is a continuation of U.S. patent application Ser. No. 15/945,726, filed on Apr. 4, 2018, the entire contents of which are incorporated herein by reference.

FIELD OF THE INVENTION

The present invention relates to computer-implemented virtual machines. More specifically, the example embodiment(s) described below relate to zero loss workload mobility with segment routing for virtual machines.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Elasticity is becoming an ever-increasingly important aspect of data-center workloads for resource optimization and resiliency. Workloads are increasingly dynamically scheduled, and migrating workloads from one host to another can improve network efficiency (e.g., by co-locating communicating workloads), resource usage (e.g., by actively balancing load), and maintenance (e.g., by shutting down a server after migrating its hosted workloads away). In this context, a mobility protocol is needed when a workload is migrated from a machine to another. Existing techniques rely on updating a mapping service with the location of the virtual machine (VM) once migration has completed. This can result in packet loss during migration. For example, a packet may be sent to the VM at a time when the VM is not running on either the initial physical machine, nor on the destination physical machine.

The techniques described herein aim to provide a better service during migration, as well as alleviating some of the burden of the mapping system to track and distribute active workload locations precisely.

SUMMARY

The appended claims may serve to summarize the disclosure.

BRIEF DESCRIPTION OF THE DRAWINGS

In the drawings:

FIG. 5 is a flow diagram depicting an example process for zero-loss routing of messages during virtual machine migration.

DETAILED DESCRIPTION

Figure 1A:
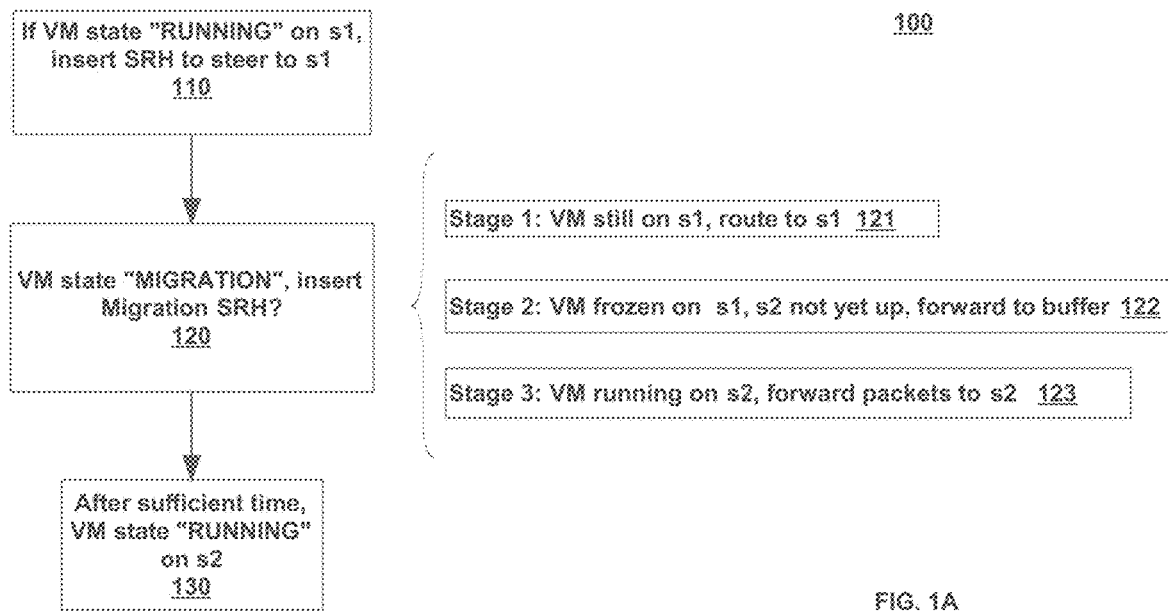
FIG. 1A and FIG. 1B are flow diagrams depicting example processes for zero-loss workload mobility with segment routing for virtual machines.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections below according to the following outline:
GENERAL OVERVIEW
EXAMPLE PROCESSES FOR ZERO-LOSS WORKLOAD MOBILITY WITH SEGMENT ROUTING FOR VIRTUAL MACHINES
EXAMPLE PROCESSES TO CONTROL FOR ROUTING TIMING
STRUCTURAL OVERVIEW
PROCESS FOR MESSAGE ROUTING
IMPLEMENTATION EXAMPLE—HARDWARE OVERVIEW General Overview As noted elsewhere herein, virtualization of computing is becoming increasingly common and important. As part of this virtualization, virtual machines run on physical servers, and for reasons ranging from network efficiency (e.g., co-locating communicating workloads) to resource usage (e.g., load balancing) to maintenance (e.g., shutting down a server after migrating its hosted workloads away) and the like, these virtual machines and their workloads may be migrated from one physical server to another. Some workloads that could benefit from workload migration also require the lowest packet loss rate possible, e.g., uncompressed video processing modules, Virtual Network Functions, banking systems, etc. Techniques herein reduce network packet loss during migration, as well as alleviating some of the burden of the mapping system to track and distribute active workload locations precisely.

In some embodiments, techniques herein provide for a "zero-loss" for network packets during workload (e.g., virtual machine) migration by using IPv6 Segment Routing (SRv6) to allow a single unicast packet to be sent to two potential IPv6 destinations (e.g., the original physical machine, and the physical machine to which the VM is being migrated) and accepted by the one that is currently active. This allows for packets already in transit during workload migration to be forwarded on to the new destination, resulting in no packet loss, and, in some embodiments, less load on the mapping system itself. The mapping system still directs at a high level the movement of workloads (virtual machine, etc.), but the migration itself happens between the old and new physical machines with traffic automatically diverting when the old location is no longer active, reducing or eliminating packet loss due to the migration. This also reduces reliance on the mapping system for fast updating and traffic redirection.

In some embodiments, the data-plane in a network node or on a given compute node co-located with an active or soon-to-be-active workload performs only light-weight processing on each packet, avoiding lookups or offline queries to mapping databases. Instead, the complexity of locating VMs (static or being migrated) is pushed to the edge and within the data plane itself.

In one embodiment, traffic coming from the outside of the data-center destined to a VM within the data-center goes through a gateway which is connected to a location gateway that will tunnel traffic for this VM through the address (locator) of the physical server hosting it.

However, when the VM is being live-migrated from one server (e.g., a physical machine) to another, the gateway inserts a Segment Routing (SR) Header comprising the addresses of those two servers. Using a 'service hunting' capability of IPv6 SR, packets will hit the first physical machine or server (s1) as long as the VM is still running on it (e.g., before or during migration), and as soon as the VM is not present anymore (and associated route to that VM is marked down or removed), they will be transparently forwarded to the second physical server (s2, the physical machine or server to which the VM is being migrated), ensuring proper delivery of all packets.

One benefit of embodiments is that the dataplane on the first physical machine doesn't have to have a record of or lookup the new location to which the VM is being migrated, nor does it need to create any tunnel. It just has to forward the packet to its local interface if the VM is present, or to the next SR segment. For example, an edge gateway may insert SR headers with {s1}, {s1, s2}, or {s2} depending on whether the VM is on the first physical server, being migrated from the first physical server to the second physical server, or on the second physical server. This is advantageous because the gateway doesn't have to be informed of the precise progress of the migration, and may insert {s1, s2} a before, during, and after the migration. Such a SR header can be pre-computed on a per-destination basis and be simply inserted in every packet destined for that destination.

Example Processes for Zero-Loss Workload Mobility with Segment Routing for Virtual Machines FIG. 1A depicts a flow diagram for an example process for zero-loss workload mobility with segment routing for virtual machines.

In some embodiments, each physical server (e.g., physical machine 210 of FIG. 2) is assigned an IPv6 physical address. The routing plane can correctly forward packets among all those physical addresses. Each server may host several virtual machines (VMs, e.g., VM 230 of FIG. 2) and run a virtual router (e.g., vRouter 220 of FIG. 2). The virtual router may be attached both to physical interfaces of the server, and to virtual interfaces linked to the VMs on each server. Each VM may be assigned an IPv6 virtual address, belonging to a virtual prefix.

As an example, a client c outside of the data-center, that needs to send packets to a VM v1. Electronic traffic from c to v1 may proceed via through a gateway s0 (e.g., gateway 260 of FIG. 2) located at the edge of the data-center. There may be a database that holds the location (i.e. the physical address) of VM v1 (represented by its virtual address in the data-center). This database (e.g., location database 270 of FIG. 2) may be updated by the data-center orchestrator when the location of v1 changes. The synchronization of s0 with the database could be implemented in different fashions (e.g., utilizing a 'push' from the database to the gateway when there are changes, a regular 'pull' from the gateway to the database, or even make the database part of the gateway s0). This database can map v1 to three different kind of entries: RUNNING(s1), MIGRATION(s1, s2), POSTMIGRATION(s2), where s1, s2 are physical IPV6 addresses.

Returning again to FIG. 1A, when the VM v1 is running on a single server s1, the database entry for v is RUNNING (s1). When the virtual router on s0 receives a packet from v0 destined to v1, it will insert 110 a segment routing header (SRH), such that the packet is (SA=v0, DA=s1) (S[0]=v1, S[1]=s1; SL=1), where SA may be "source address" and DA may be "destination address". "SL" may be segments left (remaining), and it may count down to zero while there are remaining segments. When SL is zero, the message may be at its destination.

Use of this SRH may direct the packet to the correct server, s1 (this can be seen, for example, as an SR tunnel). Inserting 110 a SRH into the packet may include inserting ascii, hex, or other characters into a header or footer of the packet. The SRH may be later interpreted in order to determine to where to send the message as described herein.

In some embodiments, an orchestrator may decide to move VM v1 from s1 to s2 and set the database entry for v1 as MIGRATION(s1, s2), where the first argument is the physical server from which the virtual machine is migrating, and the second argument is the physical machine to which the virtual machine is migrating. The arguments s1 and s2 may be the IPv6 addresses of the physical servers.

When the virtual router on s1 receives a packet from v0 destined to v1, it will insert 120 the following SRH: (SA=v0, DA=s1::search)(S[0]=v1, S[1]=s2::sbuf, S[2]=s1::search; SL=2). In some embodiments, s1::search is an END.S SID searching for v1 and s2::sbuf is an END.SBUF SID. END.S-BUF is described below and elsewhere herein. SID may refer to a segment identifier.

In some embodiments, END.S SID may be an "Endpoint in search of a target in Table T" function (termed "END.S"). In some embodiments, when N receives a packet destined to S and S is a local End.S SID, N performs the following:

| | |
|---|---|
| 1. | IF NH=SRH and SL = 0 |
| 2. | drop the packet |
| 3. | ELSE IF match(last SID) in specified table T |
| 4. | forward accordingly |
| 5. | ELSE |
| 6. | apply the End behavior |

In some embodiments, an End.S SID cannot be the last SID, as the last SID is the targeted object.

During the first phase of migration 121, the hypervisor (e.g. hypervisor 280 of FIG. 2) on s1 (iteratively) copies the memory of the VM to s2. During this, the VM is still running on s1, and the END.S SID is configured to return a match, and packets are routed to the VM on s1.

During the second phase of live migration 122, the hypervisor on s1 has finished copying the memory of the VM to s2 and freezes the VM on s1. It then sends the remaining state of the VM (e.g., remaining memory, hardware devices state, CPU registers . . . ) to s2. In some embodiments, it may be a short period of time (e.g., on the order of 100 milliseconds) when the VM is running neither on s1 nor on s2. It is during this time where standard VM migration procedures not using the techniques herein will lose packets. Thus, the benefit of using the techniques herein include not losing packets during this transition time.

Using the techniques herein, the END.S SID is configured to return a miss when v1 is running on neither s1 nor s2. It will then forward a packet to s2::sbuf, where it triggers the END.SBUF SID. This SID is a new SID, which extends the END.S SID by buffering packets while there is not (yet) a match on the searched-for physical address for v1. In some embodiments, this may allow packets sent to v1 during this time when neither s1 nor s2 are running to be cached on or near s2 while waiting for the VM to be fully started on s2. In some embodiments, the first packet that arrives on s2 after starting the virtual machine will trigger release of packets that were buffered. In some embodiments, based on the END.SBUF, the buffered packets are buffered at s2 and/or a new router running on or associated with s2. It may be advantageous to buffer the packets at or near s2 in order to reduce the time associated with the release of packets to s2. In some embodiments, when s1 is no longer running on the physical machine s1, the virtual interface on s1 will be disabled.

During the third phase of live migration 123, the hypervisor on s2 has finished receiving the whole state of the VM and the VM is restarted (or started) on s2. In routing, the END.SBUF SID now returns a match for v1, and packets arriving on s2::sbuf will trigger a release of the buffered packets to v1 (now running on physical machine s2). Once a sufficient amount of time has elapsed after migration, the orchestrator will set 130 the entry for v1 to RUNNING(s2). Packets from v0 to v1 will now be directly tunneled to s2 thanks to the use of the following SRH: (SA=v0, DA=s1) (S[0]=v1, S[1]=s2; SL=1).

Example Processes to Control for Routing Timing

Figure 1B:
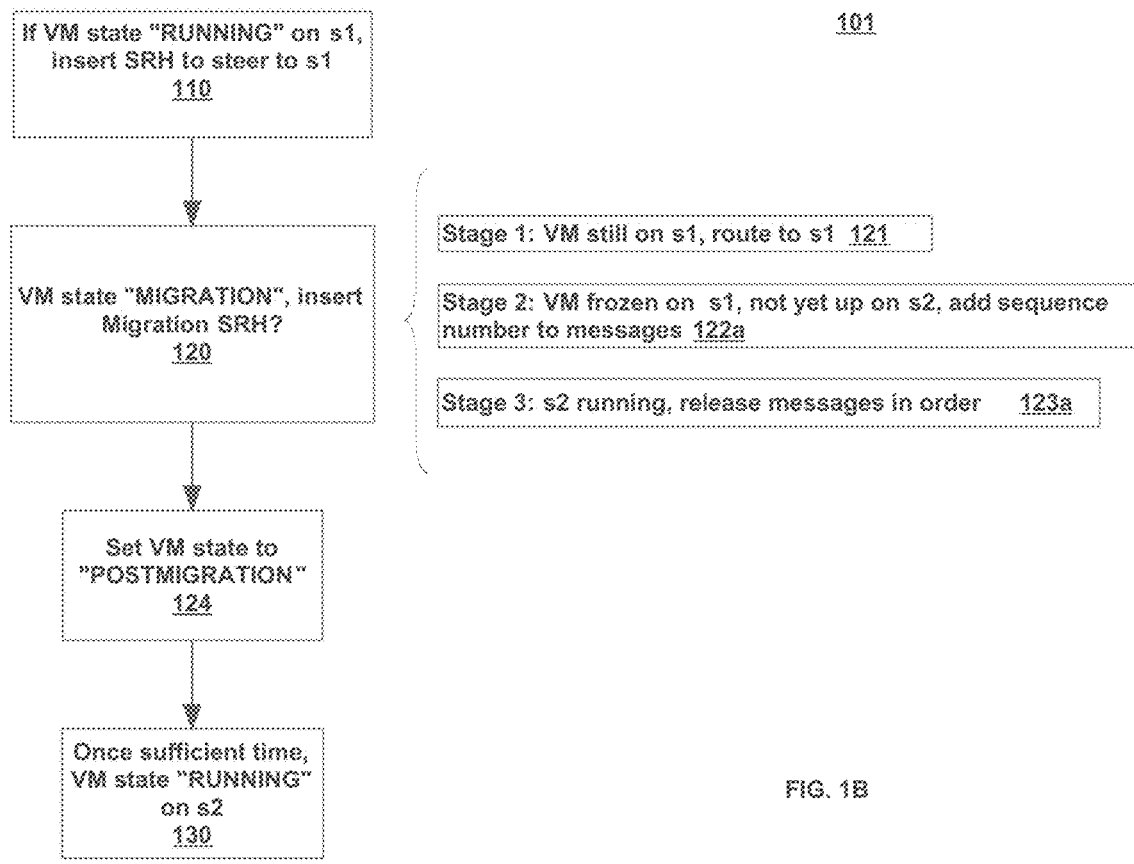

In some embodiments, the order of the buffered messages is preserved by augmenting the SRH header (and its interpretation) inserted during the second stage of migration, as depicted in process 101 of FIG. 1B. This may be beneficial when the routing time from the original source of a set of packets (v0) is variable and/or is sufficiently higher when the message goes from s0→s1→s2 as compared to when the message goes directly from s0→s2. This shorter travel time might occur because of the reduced overhead of going directly from s0 to s2, because s0 and s2 generally have low latency communication (e.g., if they are in the datacenter and s1 is not), and/or the like.

Similarly-numbered portions of process 101 FIG. 1B are similar to those of process 100 in FIG. 1A, and discussion of those is not repeated. For example, when VM v1 is running on the (pre-migration) physical server s1, the database entry for v1 is RUNNING(s1) (110), and while v1 is still running on s1 during migration, messages will still be routed to s1 (120, 121).

When v1 is no longer running or has not yet been started on v2 (second phase of live migration 122a), the second segment of the SRH inserted in the packets from v0 destined to v1 is S[1]=s2::sbufseq, with seq being an increasing sequence number added to each packet.

The third phase of live migration 123a happens when the hypervisor on s2 has finished receiving the whole state of the VM. The VM is restarted (or started) on s2. In some embodiments, the primary difference between phase 123 and phase 123a is that the END.SBUF SID releases the buffered packets in order to v1. The order of release of the packets is determined by the previously-applied sbuf:seq numbering in the SRH. By using this applied numbering, the packets will be released in order, and received in order.

Once the migration has terminated 124, the orchestrator will set the database entry for v to POSTMIGRATION(s2) for a short amount of time depending, for example, on expected latency of incoming messages and/or the travel time of messages from s0 to s2 (e.g., 1-2 seconds). During the POSTMIGRATION(s2) state, messages will continue to be buffered at s2, and previously-received messages will be released in order (as discussed above, based on their sbuf: seq number). In some embodiments, a benefit of using the POSTMIGRATION(s2) state is prevention of out-of-order delivery of packets. In some embodiments, if packets were delivered from the s0→s1→s2 migration path and from the s0→s2 post-migration path, since the latency of the second path may be lower, a packet on the second path could arrive before packets sent on the first path. Hence, while in the POSTMIGRATION(s2) state, the virtual router on s0 inserts the following SRH: (SA=v0, DA=s1::search) (S[0]=v1, S[1]=s2::sbufseq; SL=1). The use of the END.SBUF SID rather than a normal END SID allows for reordering between the two paths.

Once a sufficient amount of time has elapsed in POSTMIGRATION(s2) state (e.g., 1-2 seconds as discussed above), the process 101 can proceed 130 as if no more packets are in-flight on the s0→s1→s2 path, and that reordering between the two paths may not be needed. As in process 100, the orchestrator can then set the entry for v to RUNNING(s2).

Subsequent migrations of v1 (e.g., to another physical server s3) may follow a similar process to that described with respect to FIG. 1A and/or FIG. 1B, and the processes 100 and 101 may be performed in different circumstances and for different types of virtual machines in the same data center and/or on the same physical server.

Various embodiments and uses of SRHs, END. S, and syntax are discussed in the SRv6 Network Programming, March 2017 Draft, https://tools.ietforg/html/draft-filsfils-spring-srv6-network-programming-00, the entire contents of which is incorporated herein for all purposes. Further, various terminology and syntax used herein is further defined the SRv6 Network Programming, March 2017 Draft.

Structural Overview

Figure 2:
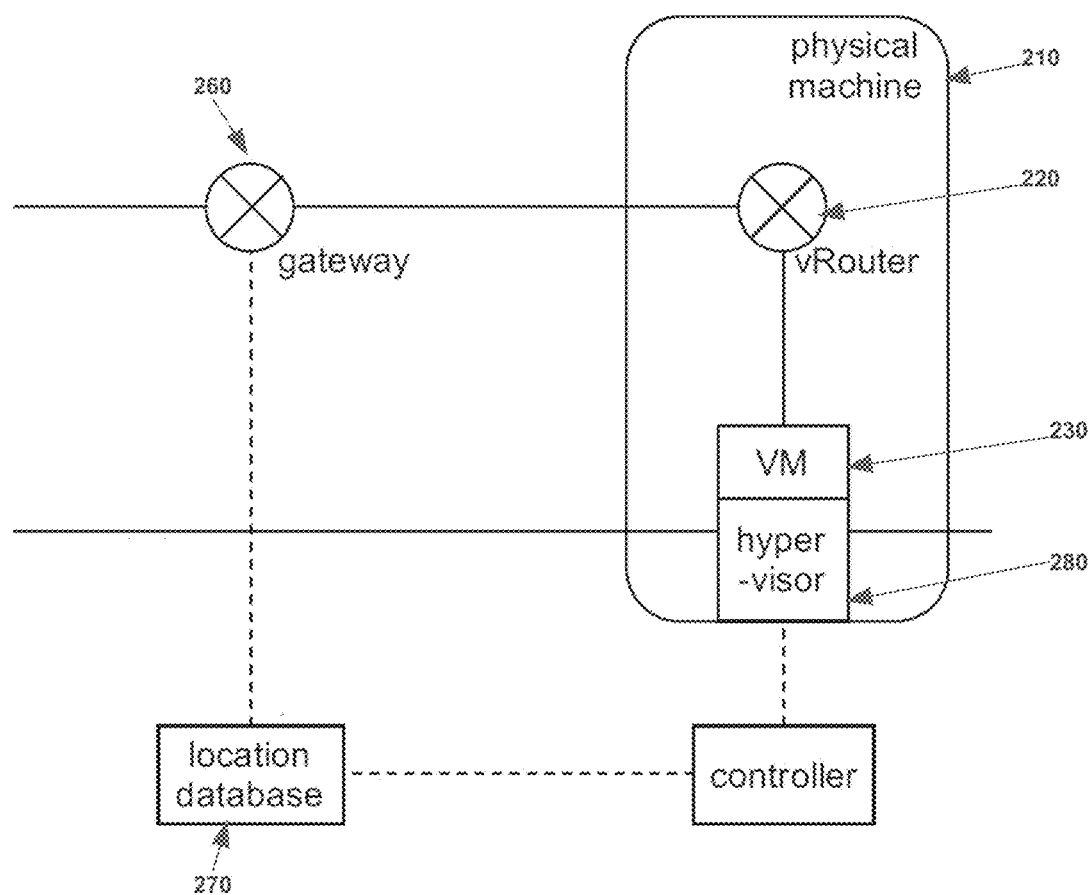
FIG. 2 is block diagram depicting an example architecture for zero-loss workload mobility with segment routing for virtual machines before migration.
Figure 3:
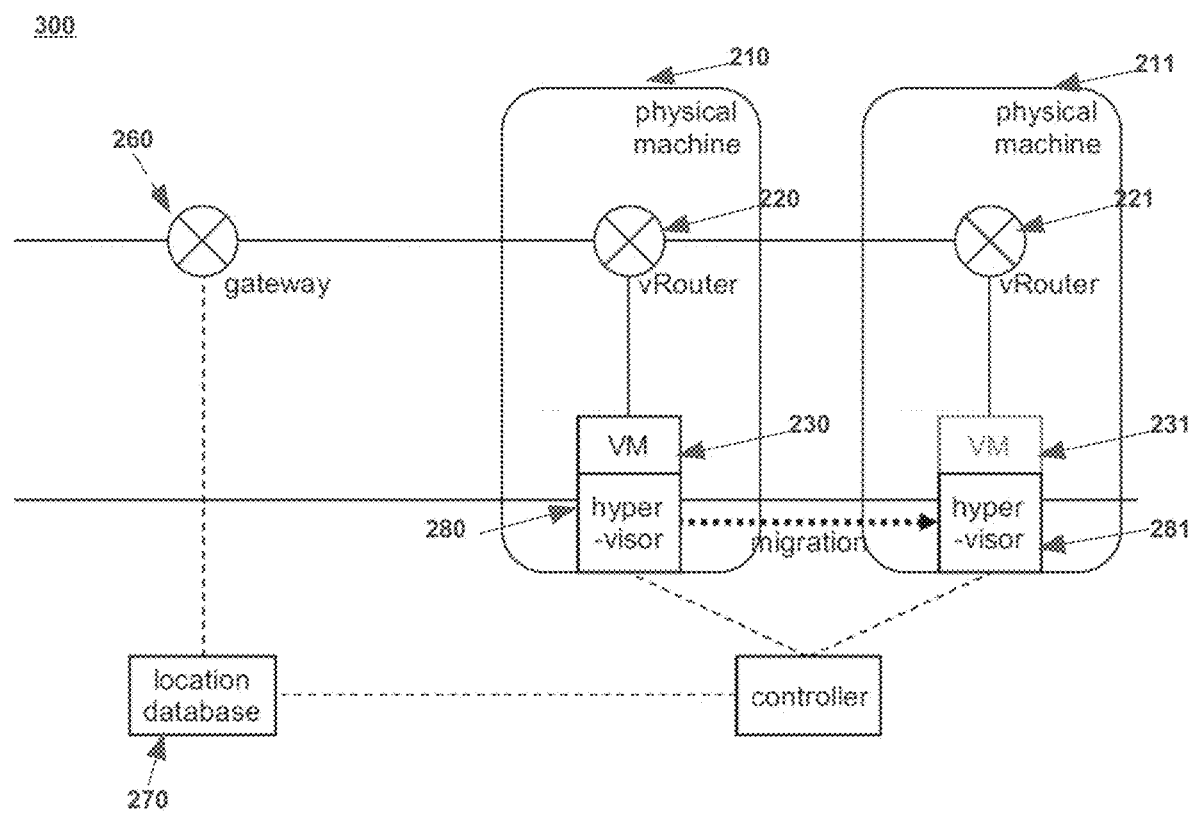
FIG. 3 is block diagram depicting an example architecture for zero-loss workload mobility with segment routing for virtual machines during migration.

FIG. 2 and FIG. 3 depict example architectures for zero-loss workload mobility with segment routing for virtual machines. Generally, FIG. 2 depicts an architecture before migration, and FIG. 3 depicts an architecture migrating a virtual machine to a different physical server. In FIG. 2, a virtual machine 230 is executing on a physical machine 210. Messages to the virtual machine 230 are routed by virtual router 220. The virtual machine is running on the physical machine 210 along with hypervisor 280. During migration, the hypervisor 280 may copy memory for the virtual machine 230 to the destination machine. A gateway 260 may process electronic message for virtual machines running on physical machine 210, for example, via virtual router 220. The location database 270 may include the addresses of the virtual machine 230 on the physical machine 210. As noted here and elsewhere herein, the address of the physical machine 210 may be the IPv6 address and the address of the virtual machine 230 may be IPv6 virtual addresses.

Turning to FIG. 3, the virtual machine 230 may be migrated from physical machine 210 to physical machine 211 (with the migrated virtual machine depicted as virtual machine 231, though, in some embodiments, virtual machine 231 will be a copy of virtual machine 230). The process of migration is discussed elsewhere herein.

In some embodiments, each physical machine 210, 211 may be a single computer or server, each running one or more processors or other computing devices. Further, the physical machines may be more than one computer or server executing as a single computing resource.

Each of the virtual machines 230, 231, virtual routers, 220, 221, hypervisors 280, 281, physical machines 210, 211, gateway 260, location database 270 may include and/or executing computer executable instructions. Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer system 110.

Process for Message Routing

FIG. 5 depicts an example process 500 for zero-loss routing of messages during virtual machine migration. In some embodiments, process 500 begins by receiving 510 a message for a virtual machine. The message for a virtual machine may be received by a gateway 260 (of FIG. 2). Virtual machines, and messages for virtual machines are discussed extensively elsewhere herein.

The gateway 260 may check 520 the state of the virtual machine. The possible states of virtual machines are discussed elsewhere herein. For example, the states may be RUNNING(s1) when the virtual machine is running on the original virtual machine. It may be MIGRATION(s1, s2) during the stages of migration from s1 to s2. It may be POSTMIGRATION(s2) in some embodiments for a brief time after the virtual machine has been migrated to the s2 server as discussed elsewhere herein. The state may be RUNNING(s2) when the virtual machine is running as normal on the migrated-to server s2. In some embodiments, the gateway 260 may look up the physical location of the virtual machine in a location database 270.

If the state of the virtual machine is RUNNING(s1) 530, then the message for the virtual machine may be routed to the virtual machine on s1, as discussed elsewhere herein.

If the state of the virtual machines is MIGRATION(s1, s2) 540, then a migration SRH may be inserted into the message, as described elsewhere herein. For example, in an initial stage of migration while the virtual machine is still running on s1, it may have an SRH inserted that will route the message to s1. If the migration is in a second stage where the virtual machine is running on neither s1 nor s2, then the inserted SRH may include an indication to buffer the message for later delivery. If the migration is in a third stage associated with the migration to s3 being complete, then the inserted SRH may route the message to s2. The message will then be routed 550 based on the SRH.

Process 500 may run on hardware depicted in FIG. 2, FIG. 3, and/or FIG. 5. Further, process 500 may run in conjunction with and/or separate from either or both of process 100 and process 101.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
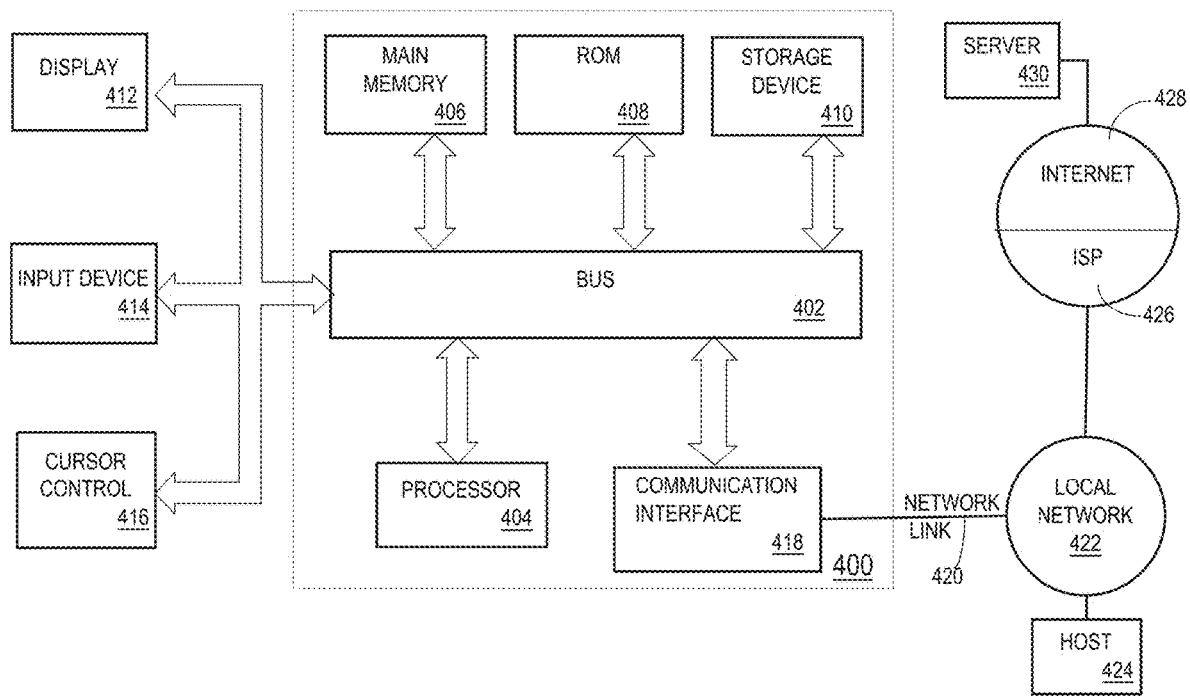
FIG. 4 is a block diagram that illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
   receiving, at a communication device in a network and from another device, a data packet to be sent to a virtual machine running on a first server;
   determining that the virtual machine is at least one of migrating, or is to be migrated, from the first server to a second server;
   identifying a first address associated with the first server and a second address associated with the second server;
   based at least in part on determining that the virtual machine is at least one of migrating, or is to be migrated, from the first server to the second server, inserting a routing tunnel header into the data packet, the routing tunnel header including the first address and the second address; and
   routing the data packet based at least in part on the routing tunnel header.

2. The method of claim 1, wherein:
   identifying the first address associated with the first server comprises identifying a first Internet Protocol version 6 (IPv6) address associated with the first server;
   identifying the second address associated with the second server comprises identifying a second IPv6 address associated with the second server; and
   interesting the routing tunnel header into the data packet comprises:
      inserting a first segment corresponding to the first IPv6 address into a Segment Routing Header (SRH) of the data packet; and
      inserting a second segment corresponding to the second IPv6 into the SRH of the data packet.

3. The method of claim 1, wherein determining that the virtual machine is at least one of migrating, or is to be migrated, from the first server to the second server comprises:
   querying, at a first time, a virtual state database to determine that the virtual machine is associated with a running state on the first server; and
   querying, at a second time, the virtual state database to determine that the virtual machine is associated with a migrating state indicating that an orchestrator has determined to migrate the virtual machine from the first server to the second server.

4. The method of claim 1, further comprising:
   querying a virtual state database managed by an orchestrator associated with the network; and
   identifying, based at least in part on the querying, an entry in the virtual state database for the virtual machine indicating a migration state from the first server to the second server.

5. The method of claim 1, further comprising:
   inserting an END.S segment routing identifier (SID) associated with the first server into the routing tunnel header; and
   inserting an END.SBUF SID associated with the second server into the routing tunnel header.

6. The method of claim 1, further comprising:
   determining that the virtual machine is still at least partially running on the first server; and
   routing the data packet to the first server based at least in part on determining that the virtual machine is still at least partially running on the first server.

7. The method of claim 1, further comprising:
   determining that the virtual machine not running on the first server or the second server; and
   routing the data packet to a message buffer on the second server based at least in part on determining that the virtual machine not running on the first server or the second server.

8. The method of claim 1, further comprising:
   determining that the virtual machine is running on the second server; and
   performing at least one of:
   routing, by the communication device, the data packet to the second server; or
   releasing one or more data packets buffered at the second server to be sent to the virtual machine.

9. A communication device disposed in a network, the communication device comprising:
   one or more processors; and
   one or more non-transitory computer-readable media storing computer-executable instructions that, when executed by the one or more processors, cause the one or more processors to perform operations comprising:
      receiving, from another device, a data packet to be sent to a virtual machine running on a first physical device;
      determining that the virtual machine is at least one of migrating, or is to be migrated, from the first physical device to a second physical device;
      identifying a first address associated with the first physical device and a second address associated with the second physical device;
      based at least in part on determining that the virtual machine is at least one of migrating, or is to be migrated, from the first physical device to the second physical device, inserting a routing tunnel header into the data packet, the routing tunnel header including the first address and the second address; and
      routing the data packet based at least in part on the routing tunnel header.

10. The communication device of claim 9, wherein:
    identifying the first address associated with the first physical device comprises identifying a first Internet Protocol version 6 (IPv6) address associated with the first physical device;
    identifying the second address associated with the second physical device comprises identifying a second IPv6 address associated with the second physical device; and
    interesting the routing tunnel header into the data packet comprises:
       inserting a first segment corresponding to the first IPv6 address into a Segment Routing Header (SRH) of the data packet; and
       inserting a second segment corresponding to the second IPv6 into the SRH of the data packet.

11. The communication device of claim 9, wherein determining that the virtual machine is at least one of migrating, or is to be migrated, from the first physical device to the second physical device comprises:
    querying, at a first time, a virtual state database to determine that the virtual machine is associated with a running state on the first physical device; and
    querying, at a second time, the virtual state database to determine that the virtual machine is associated with a migrating state indicating that an orchestrator has determined to migrate the virtual machine from the first physical device to the second physical device.

12. The communication device of claim 9, the operations further comprising:
   querying a virtual state database managed by an orchestrator associated with the network; and
   identifying, based at least in part on the querying, an entry in the virtual state database for the virtual machine indicating a migration state from the first physical device to the second physical device.

13. The communication device of claim 9, the operations further comprising:
   inserting an END.S segment routing identifier (SID) associated with the first physical device into the routing tunnel header; and
   inserting an END.SBUF SID associated with the second physical device into the routing tunnel header.

14. The communication device of claim 9, the operations further comprising:
   determining that the virtual machine is still at least partially running on the first physical device; and
   routing the data packet to the first physical device based at least in part on determining that the virtual machine is still at least partially running on the first physical device.

15. The communication device of claim 9, the operations further comprising:
   determining that the virtual machine not running on the first physical device or the second physical device; and
   routing the data packet to a message buffer on the second physical device based at least in part on determining that the virtual machine not running on the first physical device or the second physical device.

16. The communication device of claim 9, the operations further comprising:
   determining that the virtual machine is running on the second physical device; and
   performing at least one of:
   routing the data packet to the second physical device; or
   releasing one or more data packets buffered at the second physical device to be sent to the virtual machine.

17. A system comprising:
   one or more processors; and
   one or more non-transitory computer-readable media storing computer-executable instructions that, when executed by the one or more processors, cause the one or more processors to perform operations comprising:
      receiving, from another device, a data packet to be sent to a virtual machine running on a first physical device;
      determining that the virtual machine is at least one of migrating, or is to be migrated, from the first physical device to a second physical device;
      identifying a first address associated with the first physical device and a second address associated with the second physical device;
      based at least in part on determining that the virtual machine is at least one of migrating, or is to be migrated, from the first physical device to the second physical device, inserting a routing tunnel header into the data packet, the routing tunnel header including the first address and the second address; and
      routing the data packet based at least in part on the routing tunnel header.

18. The system of claim 17, wherein:
   identifying the first address associated with the first physical device comprises identifying a first Internet Protocol version 6 (IPv6) address associated with the first physical device;
   identifying the second address associated with the second physical device comprises identifying a second IPv6 address associated with the second physical device; and
   interesting the routing tunnel header into the data packet comprises:
      inserting a first segment corresponding to the first IPv6 address into a Segment Routing Header (SRH) of the data packet; and
      inserting a second segment corresponding to the second IPv6 into the SRH of the data packet.

19. The system of claim 17, the operations further comprising:
   determining that the virtual machine is still at least partially running on the first physical device; and
   routing the data packet to the first physical device based at least in part on determining that the virtual machine is still at least partially running on the first physical device.

20. The system of claim 17, the operations further comprising:
   determining that the virtual machine not running on the first physical device or the second physical device; and
   routing the data packet to a message buffer on the second physical device based at least in part on determining that the virtual machine not running on the first physical device or the second physical device.

\* \* \* \* \*